US006967899B1

(12) United States Patent
O'Brien, Jr. et al.

(10) Patent No.: US 6,967,899 B1
(45) Date of Patent: Nov. 22, 2005

(54) METHOD FOR CLASSIFYING A RANDOM PROCESS FOR DATA SETS IN ARBITRARY DIMENSIONS

(75) Inventors: Francis J. O'Brien, Jr., Newport, RI (US); Chung T. Nguyen, Austin, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/863,836

(22) Filed: Jun. 9, 2004

(51) Int. Cl.[7] ........................ H04B 11/00; G06F 17/18
(52) U.S. Cl. ........................ 367/131; 702/179; 702/181
(58) Field of Search ........................ 367/131; 702/179, 702/181

(56) References Cited

U.S. PATENT DOCUMENTS 5,144,595 A 9/1992 Graham et al.
5,612,928 A * 3/1997 Haley et al. ................ 367/131
5,675,553 A 10/1997 O'Brien, Jr. et al.
5,703,906 A 12/1997 O'Brien, Jr. et al.
5,757,675 A 5/1998 O'Brien et al.
5,781,460 A 7/1998 Nguyen et al.
5,838,816 A * 11/1998 Holmberg .................. 367/131
5,963,591 A 10/1999 O'Brien, Jr. et al.
5,966,414 A 10/1999 O'Brien, Jr.
6,397,234 B1 5/2002 O'Brien, Jr. et al.
6,411,566 B1 * 6/2002 Katz et al. .................. 367/131
6,466,516 B1 10/2002 O'Brien et al.

* cited by examiner

*Primary Examiner*—Ian J. Lobo
(74) *Attorney, Agent, or Firm*—James M. Kasischke; Michael P. Stanley; Jean-Paul A. Nasser

(57) ABSTRACT

A method is provided for automatically characterizing data sets containing data points described by d-dimensional vectors obtained by measurements, such as with sonar arrays, as either random or non-random. The data points are located by the d-dimensional vectors in a d-dimensional Euclidean space which may comprise any number d of dimensions and may comprise more than three dimensions. Large or small sets of data may be analyzed. A virtual volume is determined which contains data points from the maximum and minimums of the d-dimensional vectors. The virtual volume is then partitioned. The probability of each partition containing at least one data point for a random distribution is compared to a measurement of the number of partitions actually containing at least one data point whereby the data set is characterized as either random or non-random.

18 Claims, 2 Drawing Sheets

METHOD FOR CLASSIFYING A RANDOM PROCESS FOR DATA SETS IN ARBITRARY DIMENSIONS

STATEMENT OF GOVERNMENT INTEREST

The invention described herein may be manufactured and used by or for the Government of the United States of America for Governmental purposes without the payment of any royalties thereon or therefore.

CROSS REFERENCE TO RELATED PATENT APPLICATIONS

Related applications include the following copending applications: application of F. J. O'Brien, Jr. entitled "Detection of Randomness in Sparse Data Set of Three Dimensional Time Series Distributions," Ser. No. 10/679,866, filed 6 Oct. 2003; application of F. J. O'Brien, Jr. entitled "Enhanced System for Detection of Randomness in Sparse Time Series Distributions, Ser. No. 10/795,454," filed 3 Mar. 2004; application of F. J. O'Brien, Jr. entitled "Method for Detecting a Spatial Random Process Using Planar Convex Polygon Envelope, Ser. No 10/863,840," filed on even date with the present application; application of F. J. O'Brien, Jr. entitled "Multi-Stage Planar Stochastic Mensuration, Ser. No. 10/863,838," filed on even date with the present invention; and application of F. J. O'Brien, Jr. entitled "Method for Sparse Data Two-Stage Stochastic Mensuration, Ser. No. 10,863,839," filed on even date with the present application.

BACKGROUND OF THE INVENTION (1) Field of the Invention

The present invention relates generally to the field of sonar signal processing and, more particularly, to determining whether d-dimensional data sets are random or non-random in nature.

(2) Description of the Prior Art

Naval sonar systems require that signals be classified according to structure; i.e., periodic, transient, random or chaotic. For instance, in many cases it may be highly desirable and/or critical to know whether data received by a sonar system is simply random noise, which may be a false alarm, or is more likely due to detection of sound energy emitted from a submarine or other vessel of interest. In the study of nonlinear dynamics analysis, scientists, in a search for "chaos" in signals or other physical measurements, often resort to "embedding dimensions analysis," or "phase-space portrait analysis." One method of finding chaos is by selecting the appropriate time-delay close to the first "zero-crossing" of the autocorrelation function, and then performing delay plot analyses. Other methods for detection of spatial randomness are based on an approach sometimes known as "box counting" and/or "box counting enumerative" models. Other methods such as power spectral density (PSD) techniques may be employed in naval sonar systems. Methods such as these may be discussed in the subsequently listed patents and/or the above-cited related patent applications which are hereby incorporated by reference and may also be discussed in patents and/or applications by the inventors of the above-cited related patent applications and/or subsequently listed patents.

It is also noted that recent research has revealed a critical need for highly sparse data set time distribution analysis methods and apparatus separate and apart from those adapted for treating large sample distributions. It is well known that large sample methods often fail when applied to small sample distributions, but that the same is not necessarily true for small sample methods applied to large data sets. Very small data set distributions may be defined as those with less than about ten (10) to thirty (30) measurement (data) points.

Examples of exemplary patents related to the general field of the endeavor of analysis of sonar signals include:

U.S. Pat. No. 5,675,553, issued Oct. 7, 1997, to O'Brien, Jr. et al., discloses a method for filling in missing data intelligence in a quantified time-dependent data signal that is generated by, e.g., an underwater acoustic sensing device. In accordance with one embodiment of the invention, this quantified time-dependent data signal is analyzed to determine the number and location of any intervals of missing data, i.e., gaps in the time series data signal caused by noise in the sensing equipment or the local environment. The quantified time-dependent data signal is also modified by a low pass filter to remove any undesirable high frequency noise components within the signal. A plurality of mathematical models are then individually tested to derive an optimum regression curve for that model, relative to a selected portion of the signal data immediately preceding each previously identified data gap. The aforesaid selected portion is empirically determined on the basis of a data base of signal values compiled from actual undersea propagated signals received in cases of known target motion scenarios. An optimum regression curve is that regression curve, linear or nonlinear, for which a mathematical convergence of the model is achieved. Convergence of the model is determined by application of a smallest root-mean-square analysis to each of the plurality of models tested. Once a model possessing the smallest root-mean-square value is derived from among the plurality of models tested, that optimum model is then selected, recorded, and stored for use in filling the data gap. This process is then repeated for each subsequent data gap until all of the identified data gaps are filled.

U.S. Pat. No. 5,703,906, issued Dec. 30, 1997, to O'Brien, Jr. et al., discloses a signal processing system which processes a digital signal, generally in response to an analog signal which includes a noise component and possibly also an information component representing three mutually orthogonal items of measurement information represented as a sample point in a symbolic Cartesian three-dimensional spatial reference system. A noise likelihood determination sub-system receives the digital signal and generates a random noise assessment of whether or not the digital signal comprises solely random noise, and if not, generates an assessment of degree-of-randomness. The noise likelihood determination system controls the operation of an information processing sub-system for extracting the information component in response to the random noise assessment or a combination of the random noise assessment and the degree-of-randomness assessment. The information processing system is illustrated as combat control equipment for submarine warfare, which utilizes a sonar signal produced by a towed linear transducer array, and whose mode operation employs three orthogonally related dimensions of data, namely: (i) clock time associated with the interval of time over which the sample point measurements are taken, (ii) conical angle representing bearing of a passive sonar contact derived from the signal produced by the towed array, and (iii) a frequency characteristic of the sonar signal.

U.S. Pat. No. 5,966,414, issued Oct. 12, 1999, to Francis J. O'Brien, Jr., discloses a signal processing system which processes a digital signal generated in response to an analog signal which includes a noise component and possibly also an information component. An information processing sub-system receives said digital signal and processes it to extract the information component. A noise likelihood determination sub-system receives the digital signal and generates a random noise assessment that the digital signal comprises solely random noise, and controls the operation of the information processing sub-system in response to the random noise assessment.

U.S. Pat. No. 5,781,460, issued Jul. 14, 1998, to Nguyen et al., discloses a chaotic signal processing system which receives an input signal from a sensor in a chaotic environment and performs a processing operation in connection therewith to provide an output useful in identifying one of a plurality of chaotic processes in the chaotic environment. The chaotic signal processing system comprises an input section, a processing section and a control section. The input section is responsive to input data selection information for providing a digital data stream selectively representative of the input signal provided by the sensor or a synthetic input representative of a selected chaotic process. The processing section includes a plurality of processing modules each for receiving the digital data stream from the input means and for generating therefrom an output useful in identifying one of a plurality of chaotic processes. The processing section is responsive to processing selection information to select one of the plurality of processing modules to provide the output. The control module generates the input data selection information and the processing selection information in response to inputs provided by an operator.

U.S. Pat. No. 5,963,591, issued Oct. 5, 1999, to O'Brien, Jr. et al., discloses a signal processing system which processes a digital signal generally in response to an analog signal which includes a noise component and possibly also an information component representing four mutually orthogonal items of measurement information representable as a sample point in a symbolic four-dimensional hyperspatial reference system. An information processing and decision sub-system receives said digital signal and processes it to extract the information component. A noise likelihood determination sub-system receives the digital signal and generates a random noise assessment of whether or not the digital signal comprises solely random noise, and if not, generates an assessment of degree-of-randomness. The noise likelihood determination system controls whether or not the information processing and decision sub-system is used, in response to one or both of these generated outputs. One prospective practical application of the invention is the performance of a triage function upon signals from sonar receivers aboard naval submarines, to determine suitability of the signal for feeding to a subsequent contact localization and motion analysis (CLMA) stage.

U.S. Pat. No. 6,397,234, issued May 28, 2002, to O'Brien, Jr. et al., discloses a method and apparatus are provided for automatically characterizing the spatial arrangement among the data points of a time series distribution in a data processing system wherein the classification of said time series distribution is required. The method and apparatus utilize a grid in Cartesian coordinates to determine (1) the number of cells in the grid containing at least-one input data point of the time series distribution; (2) the expected number of cells which would contain at least one data point in a random distribution in said grid; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom.

U.S. Pat. No. 5,144,595, issued Sep. 1, 1992, to Graham et al., discloses an adaptive statistical filter providing improved performance target motion analysis noise discrimination includes a bank of parallel Kalman filters. Each filter estimates a statistic vector of specific order, which in the exemplary third order bank of filters of the preferred embodiment, respectively constitute coefficients of a constant, linear and quadratic fit. In addition, each filter provides a sum-of-squares residuals performance index. A sequential comparator is disclosed that performs a likelihood ratio test performed pairwise for a given model order and the next lowest, which indicates whether the tested model orders provide significant information above the next model order. The optimum model order is selected based on testing the highest model orders. A robust, unbiased estimate of minimal rank for information retention providing computational efficiency and improved performance noise discrimination is therewith accomplished.

U.S. Pat. No. 5,757,675, issued May 26, 1998, to O'Brien, Jr., discloses an improved method for laying out a workspace using the prior art crowding index, PDI, where the average interpoint distance between the personnel and/or equipment to be laid out can be determined. The improvement lies in using the convex hull area of the distribution of points being laid out within the workplace space to calculate the actual crowding index for the workspace. The convex hull area is that area having a boundary line connecting pairs of points being laid out such that no line connecting any pair of points crosses the boundary line. The calculation of the convex hull area is illustrated using Pick's theorem with additional methods using the Surveyor's Area formula and Hero's formula.

U.S. Pat. No. 6,466,516, issued Oct. 5, 1999, to O'Brien, Jr. et al., discloses a method and apparatus for automatically characterizing the spatial arrangement among the data points of a three-dimensional time series distribution in a data processing system wherein the classification of the time series distribution is required. The method and apparatus utilize grids in Cartesian coordinates to determine (1) the number of cubes in the grids containing at least one input data point of the time series distribution; (2) the expected number of cubes which would contain at least one data point in a random distribution in said grids; and (3) an upper and lower probability of false alarm above and below said expected value utilizing a discrete binomial probability relationship in order to analyze the randomness characteristic of the input time series distribution. A labeling device also is provided to label the time series distribution as either random or nonrandom, and/or random or nonrandom within what probability, prior to its output from the invention to the remainder of the data processing system for further analysis.

The above cited art, while extremely useful under certain circumstances, does not provide sufficient flexibility in processing different dimensionalities of data sets of sonar data. Consequently, those of skill in the art will appreciate the present invention which addresses these and other problems.

SUMMARY OF THE INVENTION

Accordingly, it is an object of the invention to provide a method for classifying data sets in arbitrary dimensions.

It is another object of the present invention to provide automated measurement of the d-dimensional spatial arrangement among either a large sample or a very small number of points, objects, measurements or the like whereby an ascertainment of the noise degree (i.e., randomness) of the time series distribution may be made.

Yet another object of the present invention is directed to methods by which sonar signals may be classified heuristically as deterministic, chaotic or random in nature.

Yet another object of the present invention is to provide a useful method for classifying data produced by naval sonar, radar, and/or lidar in aircraft and missile tracking systems as indications of how and from which direction the data was originally generated.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention provides a method for characterizing a plurality of data sets in a d-dimensional Euclidean space. The data sets are based on a plurality of measurements of physical phenomena such as sonar or radar data but may also comprise synthetic data generated by a random number generator for testing that the method is operating as expected. The method may comprise one or more steps such as, for example, reading in data points from a first data set in the d-dimensional Euclidean space to be characterized, creating a first virtual d-dimensional volume containing the data points of the first data set, and partitioning the first virtual d-dimensional volume into a plurality k of partitions. Other steps may comprise determining an expected number E(M) of the plurality k of partitions which contain at least one of the data points if the first data set is randomly dispersed, determining a number M of the plurality k of partitions which actually contain at least one of the data points, and statistically determining a range of values such that if the number M is within the range of values, then the first data set is automatically characterized as random in structure, and if the number is outside of the range of values, then the first data set is automatically characterized as non-random.

In one preferred embodiment, the plurality k of partitions may comprise a plurality k hypercuboidal subspaces. The d-dimensional Euclidean space may comprise any number d of dimensions and in a preferred embodiment may comprise three or four or more dimensions. The method may further comprise determining the sample size N of the data points and, if the sample size N is less than approximately ten to thirty, then utilizing a discrete binomial distribution for determining the range of values. If the sample size N is greater than approximately ten to thirty, then utilizing a Poisson probability distribution for determining the range of values. For data within sample sizes of N from 10 to thirty it may be desirable to utilize two different types of statistical techniques for comparison purposes. In a preferred embodiment, the step of reading data points may further comprise reading in $X_1, X_2, \ldots, X_d$ for d-dimensional vector data in the form of coordinate measurements to describe the data points. In a preferred embodiment, the method may further comprise constructing a closest fitting parallelepiped around the first data set. Other steps may comprise storing the characterization of the first data set, and then reading in data points from a second data set to be characterized. In one preferred embodiment, the method may further comprise utilizing one or more sonar arrays to produce the plurality of data sets.

The above and other novel features and advantages of the invention, including various novel details of construction and combination of parts will now be more particularly described with reference to the accompanying drawings and pointed out by the claims. It will be understood that the particular device and method embodying the invention is shown and described herein by way of illustration only, and not as limitations on the invention. The principles and features of the invention may be employed in numerous embodiments without departing from the scope of the invention in its broadest aspects.

BRIEF DESCRIPTION OF THE DRAWINGS

Reference is made to the accompanying drawings in which is shown an illustrative embodiment of the apparatus and method of the invention, from which its novel features and advantages will be apparent to those skilled in the art, and wherein.

DESCRIPTION OF THE PREFERRED EMBODIMENT

Figure 1:
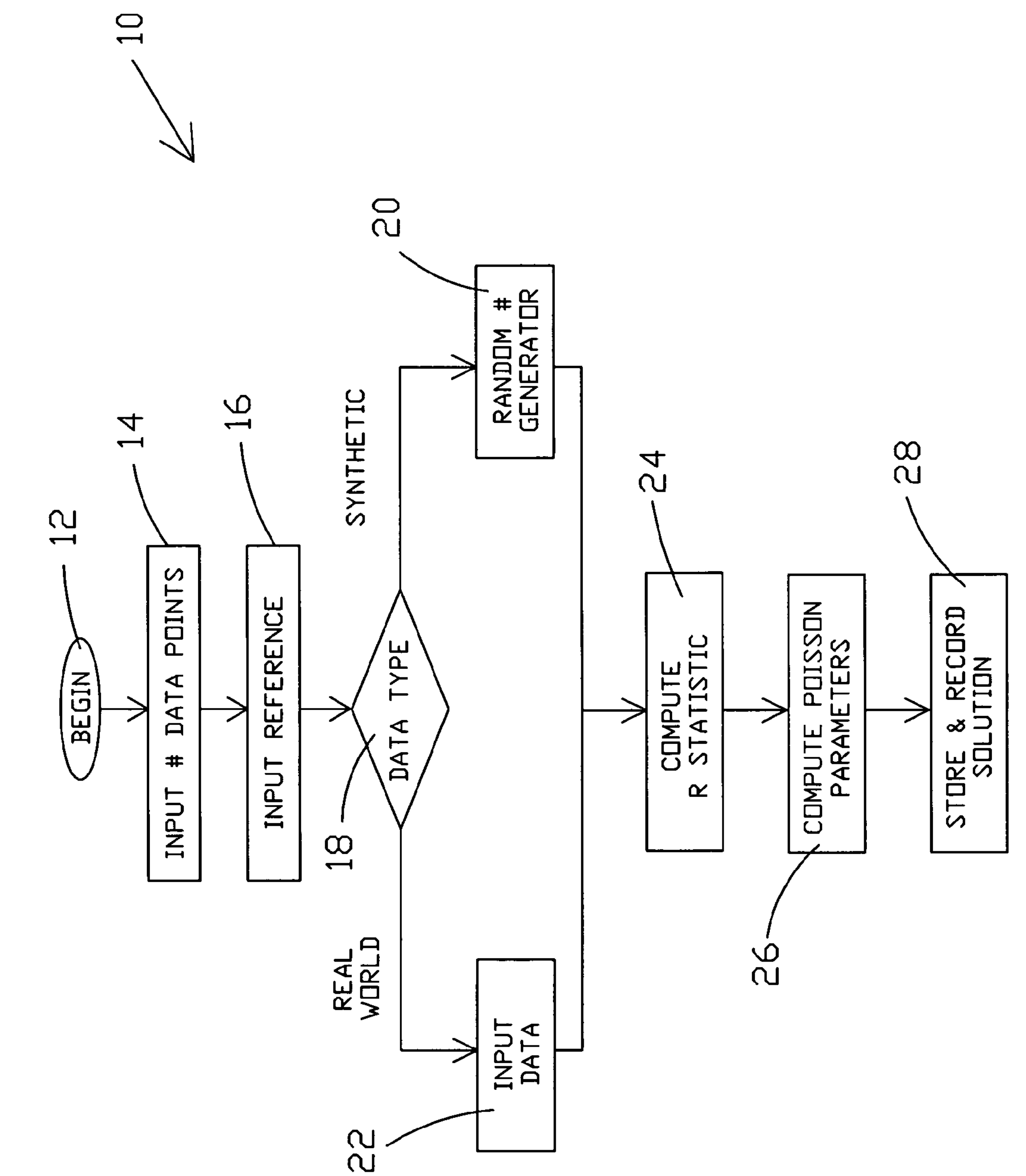
FIG. 1 is a block diagram flow chart which provides a general overview of a presently preferred embodiment of a method in accord with the present invention.

Referring now to the drawings and, more specifically to FIG. 1, there is shown an overview of the present invention wherein a presently preferred embodiment is described by flow chart or method 10. In one embodiment, the method of flow chart 10 may be derived from a probability model for the random distribution of particles in space and events in time as may be termed an elementary stochastic (Poisson) process. Accordingly, method 10 provides a generalized solution to detecting randomness in an arbitrary dimension. The method of interest may be based on an elementary stochastic (Poisson) process coupled with statistical hypothesis testing procedures. One of the many uses of the method 10 is in the field of nonlinear dynamics when sample sizes are small. However, method 10 can be utilized for large samples as well. The present invention provides an analysis which is not limited to the everyday dimensions of 3-dimensional space.

Method 10 permits a determination of whether such d-dimensional distributions are merely instances of "pure stochastic randomness" or "pure deterministic randomness" (chaos). Thus, pure randomness, pragmatically speaking, is herein considered to be a time series distribution for which no function, mapping or relation can be constituted that provides meaningful insight into the underlying structure of the distribution, but which at the same time is not chaos. Randomness may also be defined in terms of a "random process" as measured by the probability distribution model used, such as a nearest-neighbor stochastic (Poisson) process. Method 10 of the present invention provides a novel means to determine whether the signal structure is random in nature in arbitrary dimensions.

The present invention as shown in method 10 is a logical alternative to other "distance models" and, under certain circumstances, the present method offers superior performance. The present invention incorporates herein by reference the above-cited related applications. Method 10 of the present invention may, for instance, provide the naval sonar signal processing operator with greater flexibility for processing different dimensionalities of data sets.

In the novel spatial Poisson point-process method as shown in FIG. 1, one begins at 12 to analyze a sample distribution of data whereby it is assumed that particles (data points) exist that may be read in, as indicated at 14, in d-dimensional Euclidean space. Reference space 16 may be selected and/or determined, e.g., a quadrilateral or other multilateral area, hypercube, or space. The location of the particles (Cartesian coordinate measurements) as well as the total number of particles are considered random variables. The data type as indicated at 18 may be synthetic data 20, such as statistically anticipated data, or may real world data as determined from measurements which may be input as indicated at 22. Synthetic data 20 may be utilized to verify operation of the method in properly classifying data sets as random.

In method 10, an analysis is made of the d-dimensional distribution of particles contained in a finite number of random subsets (small hypercubes covering the entire space). Within each hypercuboidal subspace (in d-dimensional space) one counts the numbers of particles contained therein. An R statistic 24 is determined by comparing the actual number of points to the expected number, as discussed hereinafter. A Poisson probability distribution governs the distribution of particles in each random subset, as indicated at 26, as may be used in box counting techniques described in the related applications discussed hereinbefore. An equality is established between the elementary events of distance and the particle count. From this starting point, a single continuous distribution function is shown to equate a gamma distribution and the complement of a finite Poisson series, from which one obtains the probability distribution. Knowing the parametric values of the distribution (mean, variance) allows the researcher to appeal to the central limit theorem to test the randomness hypothesis to provide a solution for classification of the data and to store the result as indicated at 28.

For finite samples, the normal approximation formula is employed to test the hypothesis that the average sample subspace count, denoted M matches the theoretical mean of a random distribution, denoted E(M) for use in R Statistic 24. An exhaustive search in each level of dimensionally is then made to record and measure M. When the sample size N is very small ($N<25$ to 30), then the exact discrete binomial probability distribution may be used at 26 instead of the normal approximation formula (derived from the central limit theorem).

Figure 2:
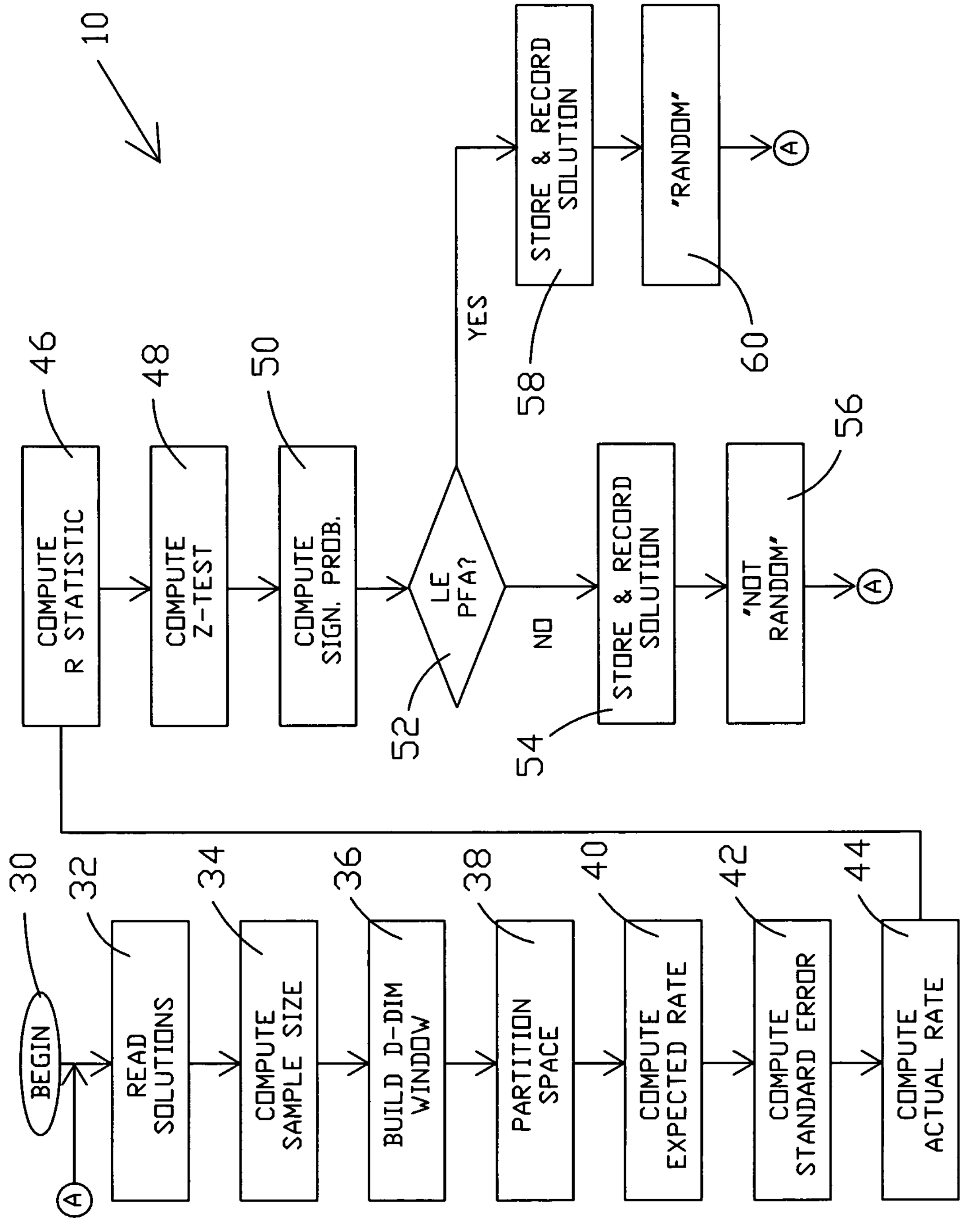
FIG. 2 is a block diagram flow chart which provides additional details of a presently preferred embodiment in accord with the present invention.

In more detail, and with reference now to FIG. 2, a preferred embodiment 10 of the method steps may comprise beginning operations with a new distribution or sampling of data points, as indicated at 30.

Step 32 may comprise reading in $X_1, X_2, \ldots, X_d$ (d-dimensional vectors) data in the form of coordinate measurements. In step 34, the number of measurements from step 32 is counted to give the sample size N.

Step 36 involves building a d-dimensional window. This is accomplished by computing the following quantities from Step 32 where (min is "minimum" and max is "maximum"):

$$\min(X_1)\max(X_1), \min(X_2)\max(X_2), \ldots, \min(X_d)\max(X_d).$$

Then, the tightest fitting parallelepiped is determined or constructed, e.g., a prism or polyhedron whose bases are parallelograms, around the N data points. The volume of this tightest fitting window has a measure of volume, $$V = \prod_{i=1}^{d} (\max(X_1) - \min(X_1)) = [(\max(X_1) - \min(X_1))(\max(X_2) - \min(X_2)) \ldots (\max(X_d) - \min(X_d))] \quad (1)$$

Step 38 involves partitioning the space or volume V into k hypercuboidal or d-dimensional cuboids subspaces or partitions wherein each hypercuboidal subspace may be sized to have a selected expected number of data points, e.g., sized such that it is statistically expected to include one or at least one data point. Some examples of partitioning for other dimensional partitions and related methods are provided in the above-cited related applications listed hereinbefore.

As per step 40, compute the theoretical number of partitions expected to be non-empty if the d-dimensional point distribution were randomly dispersed:

$$E(M) = k\left(1 - e^{-\frac{N}{k}}\right) \quad (2)$$

where E(M)="expected number" of the k subspace hypercubes to be non empty, M=actual number the k subspace hypercubes non empty, e=the mathematical constant (2.71828).

As per step 42, the standard error is given as:

$$\sigma_m = \sqrt{k\left(e^{-\frac{N}{k}}\right)\left(1 - e^{-\frac{N}{k}}\right)} \quad (3)$$

As per step 44, compute M, the actual number of non empty subspaces.

As per step 46, the R statistic from the foregoing quantities of E(M) and M are now provided by the following equation:

$$R = \frac{M}{E(M)} \quad (4)$$

In step 48, a Z-test is performed by computing the quantity:

$$Z = \frac{M - E(M)}{\sigma_\mu} \quad (5)$$

As per step 50, the significance probability is then determined by evaluating the following definite integral by a Taylor series expansion:

$$P(|Z| \le z) = 1 - \int_{-|Z|}^{|Z|} (2\pi)^{-\frac{1}{2}} e^{-\frac{x^2}{2}} dx \quad (6)$$

The "probability of a false alarm" (pfa), as used in step 52, may be set to a suitable constant, e.g., 0.05, or 0.01 or 0.001. The remaining steps occur depending upon the outcome of the decision loop of step 52.

If the probability P(|Z|≦z) as per step 52 is less than or equal to the pfa (meaning that R≈1.0), and the answer to step 52 is YES, then the procedure may preferably store and record a solution, as indicated at 58, that the data is characterized as random as indicated at 60. The flow chart then goes to designated A step which, as can be seen in the flow chart, loops back or returns to begin step 30 for processing the next window of data.

However, if the probability P(|Z|≦z) is not less than or equal to the pfa (meaning that R≠1.0) as per step 52 whereby the answer is NO, then the procedure may preferably store and record a solution, as indicated at 54, with the data being characterized as non-random as indicated at 56. The flow chart then goes to A which as noted in the flow chart returns to begin 30 for the next window of data.

As noted hereinbefore, the following ratio measure of sample to population means is as shown in step 46, $$R = \frac{M}{E(M)} \quad (7)$$

Under the null hypothesis, the sample M should be very close to E(M) in a large random distribution (i.e., R=1.0). It can be shown that the theoretical limits for R are 0≦R≦2.0, where R<1 indicates the tendency of the points to cluster, and R>1 indicates the tendency of the points to resemble a uniform distribution of hypercuboids.

The primary utility of this method is in the field of signal processing and nonlinear dynamics in which it is of interest to know whether the measurement structure is random or chaotic. The present method may be used in the field of signal processing, and nonlinear dynamics analysis. The generalization of the entire method can be taken no higher, but its application for lower dimensions is an obvious component. When sample sizes are very small, the binomial probability model may be employed in place of the central limit theorem approximation formulas.

It will be understood that many additional changes in the details, steps, types of spaces, and size of samples, and arrangement of steps or types of test, which have been herein described and illustrated in order to explain the nature of the invention, may be made by those skilled in the art within the principles and scope of the invention as expressed in the appended claims.

What is claimed is:

1. A method for characterizing a plurality of data sets in a d-dimensional Euclidean space, said data sets being based on a plurality of measurements of physical phenomena, said method comprising the steps of:

reading in data points from a first data set of said plurality of data sets, said first data set being characterized in said d-dimensional Euclidean space wherein said d-dimensional Euclidean space comprises any whole number d of dimensions;

creating a first virtual d-dimensional volume containing said data points of said first data set;

partitioning said first virtual d-dimensional volume into a plurality k of partitions;

determining an expected number E(M) of said plurality k of partitions which contain at least one of said data points if said first data set were randomly dispersed;

determining a number M of said plurality k of partitions which actually contain at least one of said data points; and statistically determining a range of values around E(M) such that if said number M is within said range of values, then said first data set is characterized as random in structure, and if said number is outside of said range of values, then said first data set is characterized as non-random.

2. The method of claim 1, wherein said plurality k of partitions comprise a plurality k hypercuboidal subspaces.

3. The method of claim 1, wherein d>3.

4. The method of claim 1 further comprising:

determining a sample size N of said data points;

if said sample size N is less than approximately twenty to thirty, then utilizing a discrete binomial distribution for determining said range of values; and if said sample size N is greater than approximately twenty to thirty, then utilizing a Poisson probability distribution for determining said range of values.

5. The method of claim 1 wherein said step of reading data points further comprises reading in $X_1, X_2, \ldots, X_d$ for d-dimensional vector data in coordinate measurements to describe said data points.

6. The method of claim 5, wherein said step of creating a first virtual d-dimensional volume containing said first data set comprises computing the following quantities for said first data set $$\min(X_1)\max(X_1), \min(X_2)\max(X_2), \ldots, \min(X_d)\max(X_d)$$

wherein min is a minimum and max is maximum for each of said coordinate measurements.

7. The method of claim 6, further comprising constructing a closest fitting parallelepiped around said first data set.

8. The method of claim 7, wherein a volume V of said parallelepiped is described by the following equation:

$$V = \prod_{i=1}^{d} (\max(X_1) - \min(X_1)) = [(\max(X_1) - \min(X_1))(\max(X_2) - \min(X_2)) \ldots (\max(X_d) - \min(X_d))].$$

9. The method of claim 1, further comprising:

determining a sample size N of said data points, and wherein $$E(M) = k\left(1 - e^{-\frac{N}{k}}\right).$$

10. The method of claim 9, further comprising determining a standard error $\sigma_m$ utilizing the following equation:

$$\sigma_m = \sqrt{k\left(e^{-\frac{N}{k}}\right)\left(1 - e^{-\frac{N}{k}}\right)}.$$

11. The method of claim 10, further comprising, determining an R statistic as:

$$R = \frac{M}{E(M)}.$$

12. The method of claim 11, further comprising performing a Z test utilizing the following equation:

$$Z = \frac{M - E(M)}{\sigma_\mu}.$$

13. The method of claim 12, further comprising determining a significance probability P(|Z|≦z) utilizing the following equation:

$$P(|Z| \leq z) = 1 - \int_{-|Z|}^{|Z|} (2\pi)^{-\frac{1}{2}} e^{-\frac{x^2}{2}}\, dx.$$

14. The method of claim 13, further comprising:

setting a probability of false alarm to a selected amount;

if P(|Z|≦z) is less than or equal to said probability of false alarm then said first data set is characterized as random; and if P(|Z|≦z) is not less than or equal to said probability of false alarm then said first data set is characterized as non-random.

15. The method of claim 14, further comprising storing how said first data set is characterized, and reading in data points from a second data set of said plurality of data sets in said d-dimensional Euclidean space to be characterized.

16. The method of claim 15, further comprising utilizing a random number generator to generate synthetic data points, and determining whether R is approximately equal to 1.0 for method operation verification purposes.

17. The method of claim 15, wherein if R<1, then indicating that said data points cluster, and if R>1, then indicating that said data points are more uniformly distributed through said plurality of partitions.

18. The method of claim 1, further comprising utilizing at least one sonar array to produce said plurality of data sets as a time series distribution of acoustic signal which may include sound energy from a sound emitting underwater object such that characterization of whether said first data set is random or non-random is useful in identifying presence of the object.

* * * * *

UNITED STATES PATENT AND TRADEMARK OFFICE

CERTIFICATE OF CORRECTION

PATENT NO. : 6,967,899 B1

APPLICATION NO. : 10/863836

DATED : November 22, 2005

INVENTOR(S) : Francis J. O'Brien, Jr. and Chung T. Nguyen

It is certified that error appears in the above-identified patent and that said Letters Patent is hereby corrected as shown below:

In Col. 1, line 18, replace "10/679,866" with --10/679,868--.

In Col. 1, line 21, replace "Time Series Distributions, Serial No. 10/795,454"" with --Time Series Distributions," Serial No. 10/794,545--.

In Col. 1, lines 24-25, replace "on even date with the present application" with --1 June 2004--.

In Col. 1, line 30, replace "on even date with the present application" with --1 June 2004--.

Signed and Sealed this

Eleventh Day of November, 2008

JON W. DUDAS

*Director of the United States Patent and Trademark Office*